(No Model.)

W. McELROY.
INSULATED JOINT FOR LIGHT FIXTURES.

No. 572,124. Patented Dec. 1, 1896.

WITNESSES:
John Becker
Fred White

INVENTOR:
William McElroy,
By his Attorneys,
Arthur E. Fraser & Co.

THE NORRIS PETERS CO., PHOTO-LITHO., WASHINGTON, D. C.

United States Patent Office.

WILLIAM McELROY, OF BROOKLYN, NEW YORK, ASSIGNOR OF TWO-THIRDS TO GEORGE WILLIAM BAYLEY, OF SAME PLACE, AND FRED WHITE, OF NEW YORK, N. Y.

INSULATED JOINT FOR LIGHT-FIXTURES.

SPECIFICATION forming part of Letters Patent No. 572,124, dated December 1, 1896.

Application filed July 26, 1892. Serial No. 441,281. (No model.)

*To all whom it may concern:*

Be it known that I, WILLIAM MCELROY, a citizen of the United States, residing in Brooklyn, in the county of Kings and State of New York, have invented certain new and useful Improvements in Insulated Joints for Light-Fixtures, Pipe-Couplings, and Similar Devices, of which the following is a specification.

This invention relates to that class of insulating-joints adapted for use between the respective sections of light-fixtures, pipe couplings or unions, and similar devices where it is desired to prevent electrical communication through the joint while preserving a conduit or passage therethrough. Such couplings are especially designed for combined gas and electric light fixtures.

Heretofore various couplings of this character have been used, among others that claimed in the joint application for patent made by George William Bayley and myself, filed May 9, 1891, Serial No. 392,224, which is provided with a depending lip adapted to receive the drip through the coupling and precipitate it centrally of the passage therethrough, whereby it is prevented from accumulating across the joint and thereby forming electrical connection between the sections thereof. My present invention is designed to provide an improved joint or coupling of this general character, and my improved joint is distinguished from that claimed in said application in that the lip is a separate piece from the other parts of the coupling and in that the lip embraces the walls of the aperture through the insulating material and reinforces this material against inward distortion.

To this end in carrying out my invention I provide an annular tubular lip or piece, preferably constructed to embrace the inner wall or passage through the insulating material of the joint to resist its inward distortion, preferably comprising a separate piece distinct from the other members of the coupling, and preferably of less diameter at its discharge end than the internal diameter of the lower section of the coupling and of the pipe connected thereto and disposed to precipitate the drip through the joint near the center of the passage therethrough.

Figure 1:
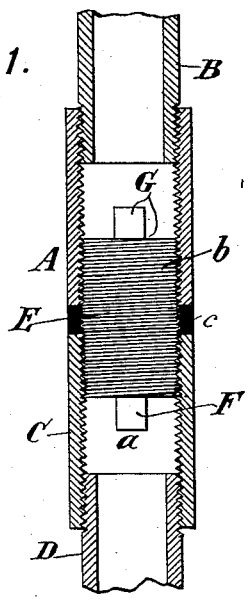
Figure 2:
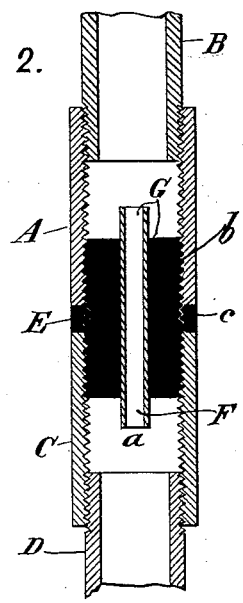
Figure 3:
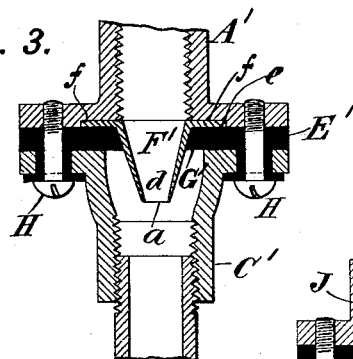
Figure 4:
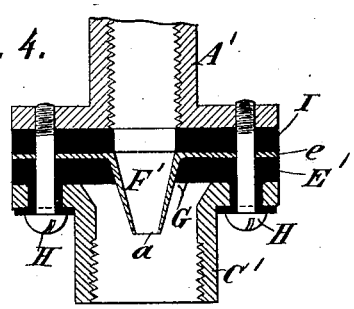
Figure 5:
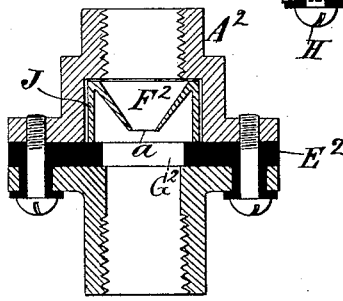

In the accompanying drawings, which illustrate certain adaptations of my invention, Figure 1 is an axial section of the upper and lower metallic sections of a pipe-coupling, showing the intermediate insulating parts in elevation, the parts being constructed according to the preferred form of my invention. Fig. 2 is a complete axial section of the same coupling. Fig. 3 is an axial section of a coupling, showing a modified form of my invention. Fig. 4 is a similar view showing another modification. Fig. 5 is a similar view showing another modification.

Referring to the drawings, let A indicate the uppermost tubular metallic section of the coupling; B, a gas-pipe to which it is connected; C, the lowermost tubular metallic section; D, a gas-pipe to which it is connected; E, the intervening insulating material, and F my improved tubular lip or piece.

The sections A and C may be of any suitable or well-known construction. The one should constitute or be adapted for connection with the gas-pipe B or other provision to which the coupling is to be applied, and the other or lower one should constitute or be adapted for connection with a gas-pipe B, a light-fixture, or other tubular provision to be coupled to the uppermost section.

The intervening insulating material may be of any well-known construction adapted to prevent electrical communication between the upper and lower sections A C. It should have a perforation, aperture, or passage from top to bottom to provide a conduit between the sections. This conduit is lettered G. The lip or tubular piece F should preferably be a metallic piece separate from the other members of the coupling and preferably traversing the perforation, aperture, or conduit G through the insulating material E in intimate contact with the inner wall of this perforation or conduit to prevent inward distortion thereof during or after the uniting of the parts, and it should have, preferably, a depending lip *a*, of less internal diameter than the adjacent passage through the lower section C and its pipe D, whereby the drip traversing the lip would be precipitated from its lower edge nearer the center of the passage through the lower members of the coupling, and will thereby be prevented from accumulating across the joint and making electrical communication between the lower and upper sections. These parts can be variously constructed and arranged without departing from my invention.

The particular construction shown in Figs. 1 and 2 is a preferred form of my invention. In this construction the sections A and C are internally-screw-threaded tubular metallic parts, and the insulating portion E consists of a tube $b$, of insulating material, having a cylindrical aperture or conduit G through its center and screw-threaded on its exterior for engagement with the adjacent screw-thread of the upper and lower metallic portions and an insulating ring or washer $c$, surrounding the middle portion of the piece $b$ and clamped between the ends of the sections A and C to prevent contact between them. The lip F is here a short piece of metallic tubing forced through the aperture or conduit G of the piece $b$ and protruding beyond this piece slightly at top and also at bottom in the form of a depending annular lip, edge, or projection $a$. This discharge end of the lip is of less external diameter than the internal diameter of the adjacent parts of the coupling and of the pipe D, connected thereto, and is constructed to precipitate the drip from its lower edge near the center of the passage through these portions of the coupling. In assembling this construction of coupling the piece F is located in the piece $b$, the latter is screwed part way into the end of the upper metallic section, the ring $c$ is applied, and then the other metallic section is screwed onto the other end of the piece $b$ until the ring $c$ is clamped tightly between them, whereupon the coupling is complete and ready for application to the respective sections of the pipe. When so applied, the tubular insulating-piece $b$ resists the separating strain between the sections A and C, and the piece F resists the tendency to inward distortion of the insulating material and affords through its interior a conduit or passage between the sections.

In the construction shown in Fig. 3 the insulating-piece (here lettered E') consists of a flat washer having a tapering aperture G', which washer is clamped between the upper section (lettered A') and the lower section (lettered C') by insulated screws H H, engaging the flanges of the respective sections. The lip is here lettered F' and consists of a separate piece having a conical tubular portion (lettered $d$) terminating in a contracted lower edge or outlet $a$, which portion depends through the aperture in the insulating material and reinforces it against inward distortion, and above this tubular portion the lip is constructed with a lateral flange $e$, bearing on the upper side of the insulating material, seating in a recess $f$ in the upper section and held by the latter in position.

In the construction shown in Fig. 4 the parts are substantially identical with those shown in Fig. 3 and bear the same reference-letters, the difference in this construction being that the flange $e$ of the lip or piece F' extends to the edge of the coupling, is perforated to receive the screws H H, and is covered at top by an auxiliary washer I, of insulating material, against which the upper section A' is clamped.

In the construction shown in Fig. 5 the lip (here lettered $F^2$) is a separate piece having an annular body portion (lettered J) resting at its bottom edge on the insulating-washer, (here lettered $E^2$,) and extending thence upwardly within the upper section, (here lettered $A^2$,) and thence downwardly in the form of a funnel, and terminating in the depending lip $a$. In this instance the lip does not contact with or reinforce the aperture to the insulating material.

What I claim is, in insulated joints for light-fixtures, pipe coupling or unions, and similar devices, the following-defined novel features and combinations, substantially as hereinbefore set forth, namely:

1. An insulated joint comprising two tubular metallic sections, one above the other, an insulating material between said sections for insulating them, having an aperture affording communication between said sections, in combination with a tubular metallic lip traversing said aperture in said material in intimate contact with the walls of said aperture, said lip preventing inward distortion of said insulating material, affording a passage through the joint, and discharging the drip therethrough near the center of the lower section.

2. An insulated joint comprising two tubular metallic sections, one above the other, an insulating material between said sections for insulating them, having an aperture affording communication between said sections, and a separate tubular piece within said joint having an annular lip of less inner diameter than said aperture through said insulating material, said piece receiving the drip from the uppermost of said sections and precipitating it from said lip through said aperture and into said lowermost section near its center.

3. An insulated joint comprising two tubular metallic sections one above the other, an insulating material between said sections for insulating them and a separate tubular piece within said joint constructed with a depending annular lip of less inner diameter than the passage through the lowermost of said sections, and adapted to receive the drip from the uppermost of said sections and precipitate it within said lowermost section near its center.

4. An insulated joint comprising two tubular metallic sections, one above the other, an insulating material between said sections for insulating them and having a conduit or aperture communicating between said sections in combination with a tubular piece or lip separate from said sections, traversing said aperture in intimate contact with the walls thereof, for preventing inward distortion of such insulating material, and constructed to afford a passage through the joint and to discharge the drip therethrough within said lowermost section near its center.

5. An insulated joint comprising two tubular metallic sections one above the other, screw-threaded internally, a tubular piece of insulating material between said sections for insulating them, screw-threaded externally, for engagement with the internal screw-threads of said sections, and a tubular piece or lip traversing said insulating-piece to prevent its inward distortion and constituting internally a passage between said sections.

6. An insulated joint comprising tubular metallic sections A C, one above the other and internally screw-threaded, in combination with insulating-piece E having conduit G, externally screw-threaded and engaging the screw-threads of said sections, ring $c$ surrounding said insulating-piece between the ends of said sections, and tubular piece F traversing said insulating-piece to prevent its inner distortion.

In witness whereof I have hereunto signed my name in the presence of two subscribing witnesses.

WILLIAM McELROY.

Witnesses:
   GEORGE H. FRASER,
   CHARLES K. FRASER.